United States Patent
Lacoss-Arnold et al.

(10) Patent No.: US 12,282,915 B2
(45) Date of Patent: *Apr. 22, 2025

(54) METHOD AND SYSTEM FOR ANONYMOUS DIRECTED BLOCKCHAIN TRANSACTION

(71) Applicant: Mastercard International Incorporated, Purchase, NY (US)

(72) Inventors: Jason Jay Lacoss-Arnold, St. Louis, MO (US); Stephen Higgins, Dublin (IE)

(73) Assignee: Mastercard International Incorporated, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/605,150

(22) Filed: Mar. 14, 2024

(65) Prior Publication Data

US 2024/0220975 A1    Jul. 4, 2024

Related U.S. Application Data

(63) Continuation of application No. 15/387,906, filed on Dec. 22, 2016, now Pat. No. 11,978,045.

(51) Int. Cl.
*G06Q 20/38* (2012.01)
*G06Q 20/02* (2012.01)
(Continued)

(52) U.S. Cl.
CPC ......... *G06Q 20/383* (2013.01); *G06Q 20/027* (2013.01); *G06Q 20/382* (2013.01);
(Continued)

(58) Field of Classification Search
None
See application file for complete search history.

(56) References Cited

U.S. PATENT DOCUMENTS 6,298,153 B1 * 10/2001 Oishi .................... H04L 9/3013
380/45
6,889,325 B1 * 5/2005 Sipman ................ H04L 63/126
380/37
(Continued)

FOREIGN PATENT DOCUMENTS

EP          2874094 B1 *  4/2016  ............. G06F 21/64
WO    2001013572 A1     2/2001
(Continued)

OTHER PUBLICATIONS

Hearing Notice, dated Nov. 21, 2023, issued in corresponding Indian Application No. 201817007052, 3 pages.
(Continued)

*Primary Examiner* — Neha Patel
*Assistant Examiner* — Jahed Ali
(74) *Attorney, Agent, or Firm* — Panitch Schwarze Belisario & Nadel LLP

(57) ABSTRACT

A method for posting of anonymous directed transaction includes: storing a plurality of entity profiles, each including an entity identifier and a secret value; receiving a transaction request from a first entity, the request including transaction data and a specific entity identifier associated with a second entity; identifying a specific entity profile that includes the specific entity identifier; generating a first hash value via application of one or more hashing algorithms to the transaction data; generating a second hash value via application of one or more hashing algorithms to a combination of the first hash value and the secret value included in the identified specific entity profile; and posting the first hash value and second hash value to a publicly accessible data source.

12 Claims, 7 Drawing Sheets

(51) Int. Cl.
*H04L 9/08* (2006.01)
*H04L 9/40* (2022.01)

(52) U.S. Cl.
CPC ....... *G06Q 20/3827* (2013.01); *H04L 9/0869* (2013.01); *H04L 63/0823* (2013.01); *G06Q 2220/00* (2013.01)

(56) References Cited

U.S. PATENT DOCUMENTS

| | | | | |
|---|---|---|---|---|
| 8,423,457 | B1* | 4/2013 | Schattauer | G06Q 20/387 705/16 |
| 9,397,985 | B1* | 7/2016 | Seger, II | H04L 63/0442 |
| 9,710,808 | B2* | 7/2017 | Slepinin | G06Q 20/3829 |
| 9,870,562 | B2* | 1/2018 | Davis | G06Q 20/02 |
| 2007/0253260 | A1* | 11/2007 | Pavlis | G06Q 30/08 365/189.02 |
| 2011/0141974 | A1* | 6/2011 | Lieberman | H04L 51/58 370/328 |
| 2013/0282580 | A1* | 10/2013 | O'Brien | G06Q 20/24 705/44 |
| 2014/0095219 | A1* | 4/2014 | Zises | G06Q 30/06 705/5 |
| 2014/0201057 | A1* | 7/2014 | Shuster | G06Q 40/04 705/37 |
| 2014/0279403 | A1* | 9/2014 | Baird | G06Q 20/027 705/38 |
| 2015/0026072 | A1* | 1/2015 | Zhou | G06Q 20/401 705/41 |
| 2015/0046337 | A1* | 2/2015 | Hu | G06Q 20/36 705/41 |
| 2015/0142656 | A1 | 5/2015 | Lacoss-Arnold | |
| 2015/0294291 | A1 | 10/2015 | Lacoss-Arnold et al. | |
| 2016/0065593 | A1* | 3/2016 | Bengochea | G06F 9/542 726/29 |
| 2016/0142409 | A1* | 5/2016 | Frei | G06F 21/33 713/176 |
| 2016/0292680 | A1* | 10/2016 | Wilson, Jr. | H04L 9/30 |
| 2016/0342978 | A1* | 11/2016 | Davis | G06Q 20/0655 |
| 2016/0342994 | A1* | 11/2016 | Davis | G06Q 40/02 |
| 2017/0344988 | A1* | 11/2017 | Cusden | G06F 21/00 |
| 2017/0364552 | A1* | 12/2017 | Pattanaik | H04L 9/3239 |
| 2018/0053161 | A1* | 2/2018 | Bordash | G06Q 20/3676 |
| 2018/0247296 | A1* | 8/2018 | Win | G06Q 30/0207 |
| 2019/0215696 | A1* | 7/2019 | Ying | H04L 9/3247 |

FOREIGN PATENT DOCUMENTS

| | | | | |
|---|---|---|---|---|
| WO | WO-0113572 | A1* | 2/2001 | H04L 63/0435 |
| WO | WO-2016186869 | A1* | 11/2016 | G06Q 10/00 |

OTHER PUBLICATIONS

Notification of Transmittal of the International Search Report and the Written Opinion of the International Searching Authority (Forms PCT/ISA/220, PCT/ISA/210, PCT/ISA/237) issued on Feb. 21, 2018, by the European Patent Office in corresponding International Application No. PCT/US2017/060272. (11 pages).

* cited by examiner

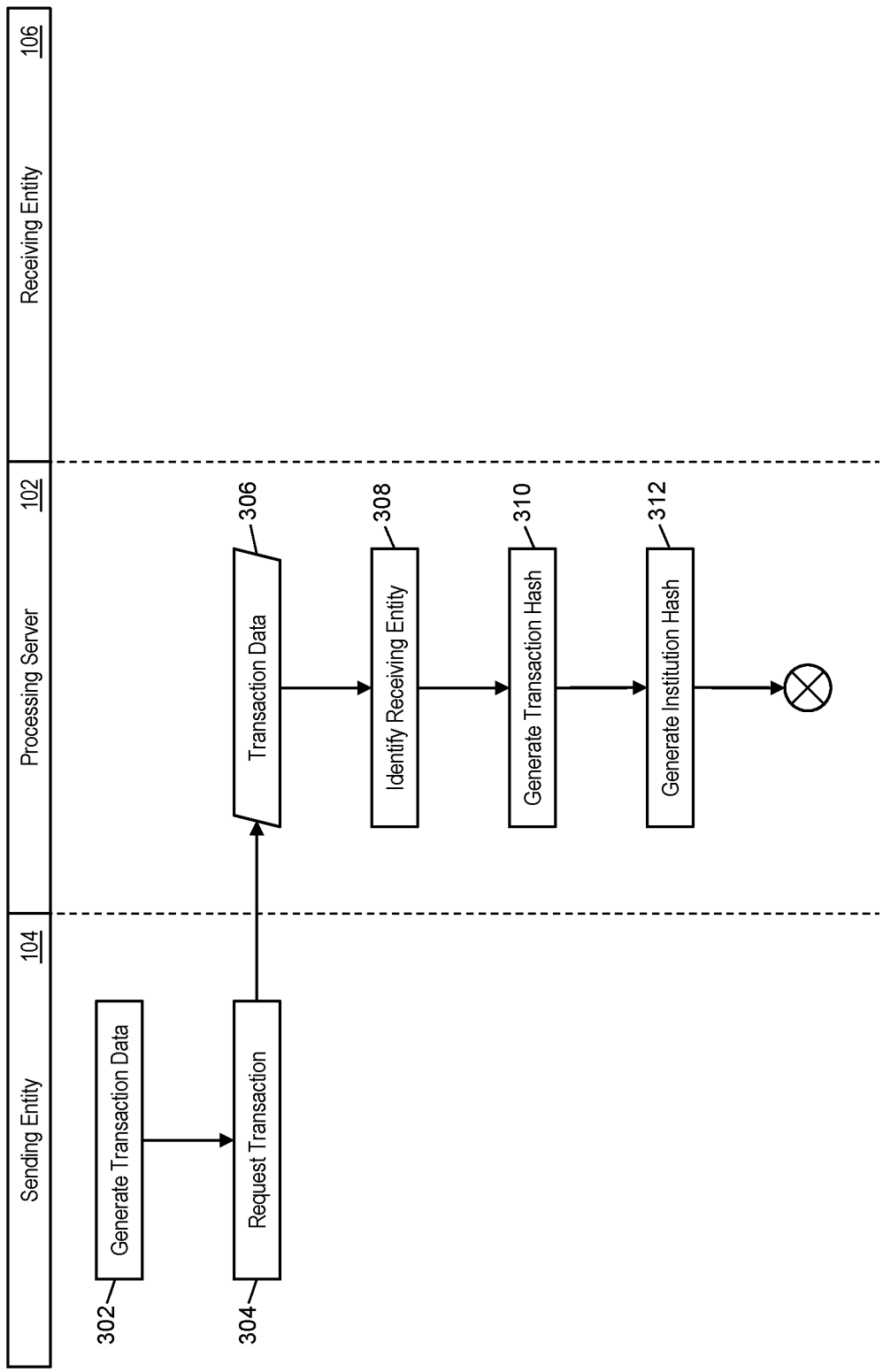

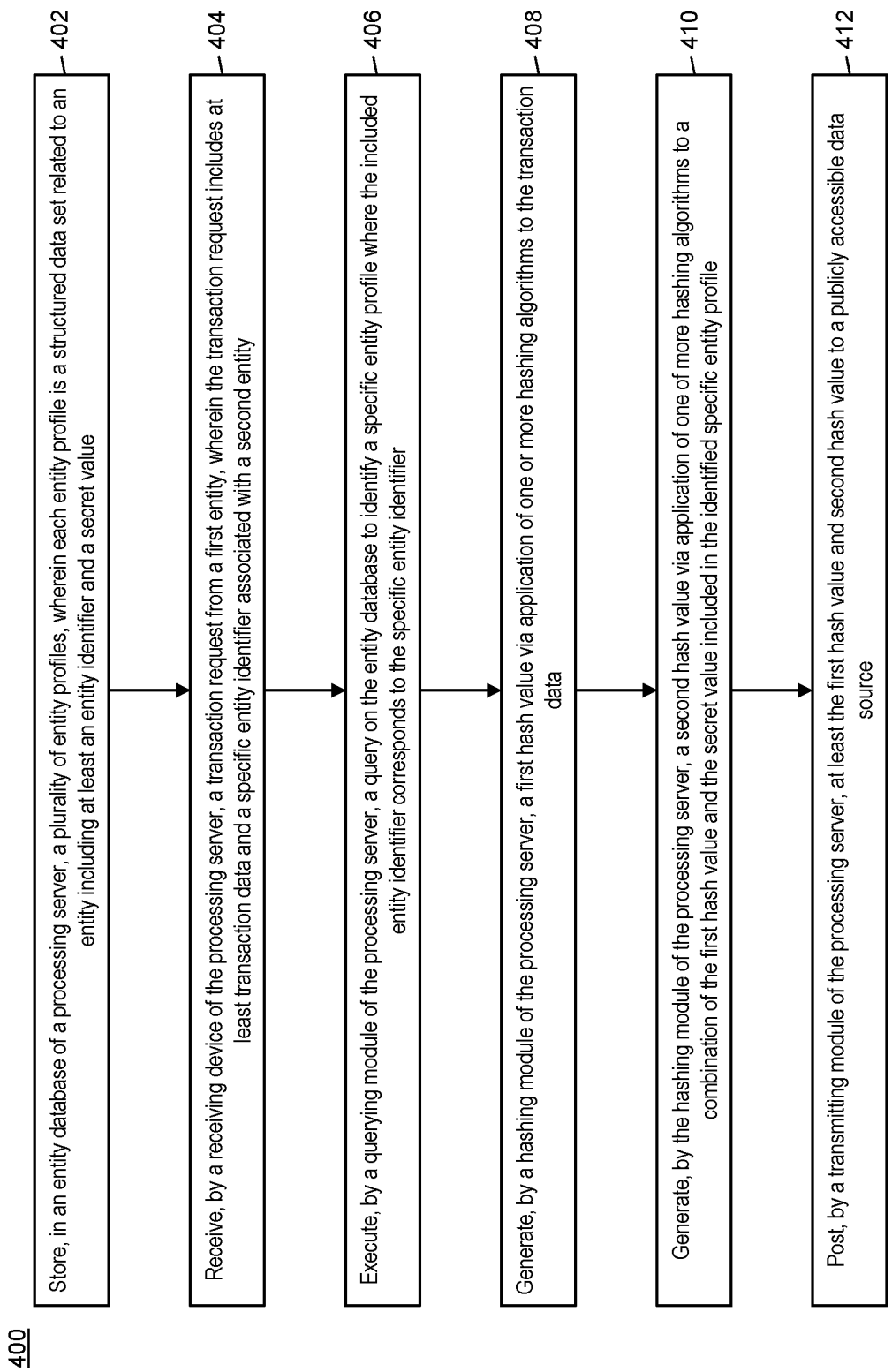

METHOD AND SYSTEM FOR ANONYMOUS DIRECTED BLOCKCHAIN TRANSACTION

FIELD

The present disclosure relates to the posting of an anonymous directed transaction to a publicly accessible data source, such as a blockchain, where neither party to a transaction may be identifiable to all outside parties, and where a party is not identifiable across multiple transactions.

BACKGROUND

Individuals, businesses, and other entities often conduct payment transactions on a daily basis, with some entities being involved in hundreds, thousands, or even millions of transactions each day. In some cases, an entity may have a desire to participate anonymously in one or more of their transactions, such as if they do not want a third party to be aware of their transaction. For example, an individual may want to purchase a surprise gift for their significant other without the merchant being revealed, or a business may want to conduct transactions anonymously such that competing entities may not be aware of the volume of their business or the other entities that they do business with.

However, existing methods for enabling an entity to participate in a transaction anonymous requires a third party to participate in the transaction on behalf of the entity as a stand-in. For instance, the entity wishing to be anonymous pays a third party to purchase a product from the selling entity, where the selling entity is unaware of the buying entity's identity. Unfortunately, such methods require the entity to not only make the third party aware of their identity, but also requires the entity to reveal the nature of their purchase to the third party, as well as requires a significant amount of trust in the third party to not reveal their identity and to make the purchase and forward the good or service successfully. Furthermore, the private nature of such an agreement may also reduce accountability of the third party and expose information if recourse is sought.

This presents a technical challenge in that identifiers of a party to blockchain transactions are generally viewable to those having access to the blockchain. Thus, there is a need for a technical solution whereby an entity may participate in a transaction where transaction details may be posted publicly to ensure accountability and trust in the data, while still providing anonymity and inability of others to track individual transactions or volume information by transaction party identifying information of both parties of a transaction to satisfy the confidentiality needs of each entity involved in the transaction.

SUMMARY

The present disclosure provides a description of systems and methods for posting anonymous directed transactions. A third party processing server is used as a go-between between the two entities participating in the transaction, where the payer may notify the processing server of a transaction to pay the payee, with the transaction being made publicly available using hash values for each entity that are unbeknownst to all other entities. In addition, the hash values may change with each transaction, to ensure that the transaction volume for an entity may not be identified and to further prevent efforts to identify an entity involved in a transaction. The result is a convenient and efficient system that may retain a higher level of privacy, confidentiality, security, and/or accountability than various existing systems.

A method for posting of anonymous directed transaction includes: storing, in an entity database of a processing server, a plurality of entity profiles, wherein each entity profile is a structured data set related to an entity including at least an entity identifier and a secret value; receiving, by a receiving device of the processing server, a transaction request from a first entity, wherein the transaction request includes at least transaction data and a specific entity identifier associated with a second entity; executing, by a querying module of the processing server, a query on the entity database to identify a specific entity profile where the included entity identifier corresponds to the specific entity identifier; generating, by a hashing module of the processing server, a first hash value via application of one or more hashing algorithms to the transaction data; generating, by the hashing module of the processing server, a second hash value via application of one of more hashing algorithms to a combination of the first hash value and the secret value included in the identified specific entity profile; and posting, by a transmitting module of the processing server, at least the first hash value and second hash value to a publicly accessible data source.

A system for posting of anonymous directed transaction includes: storing, in an entity database of a processing server, a plurality of entity profiles, wherein each entity profile is a structured data set related to an entity including at least an entity identifier and a secret value; a receiving device of the processing server configured to receive a transaction request from a first entity, wherein the transaction request includes at least transaction data and a specific entity identifier associated with a second entity; a querying module of the processing server configured to execute a query on the entity database to identify a specific entity profile where the included entity identifier corresponds to the specific entity identifier; a hashing module of the processing server configured to generate a first hash value via application of one or more hashing algorithms to the transaction data, and a second hash value via application of one of more hashing algorithms to a combination of the first hash value and the secret value included in the identified specific entity profile; and a transmitting module of the processing server configured to post at least the first hash value and second hash value to a publicly accessible data source.

BRIEF DESCRIPTION OF THE DRAWING FIGURES

The scope of the present disclosure is best understood from the following detailed description of exemplary embodiments when read in conjunction with the accompanying drawings. Included in the drawings are the following figures:

FIGS. 3A and 3B are a flow diagram illustrating a process for the posting of an anonymous directed transaction on a publicly accessible data source in the system of FIG. 1 in accordance with exemplary embodiments.

FIG. 4 is a flow chart illustrating an exemplary method for posting auditable, immutable data to a blockchain in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Posting of Anonymous Directed Transactions

Figure 1:
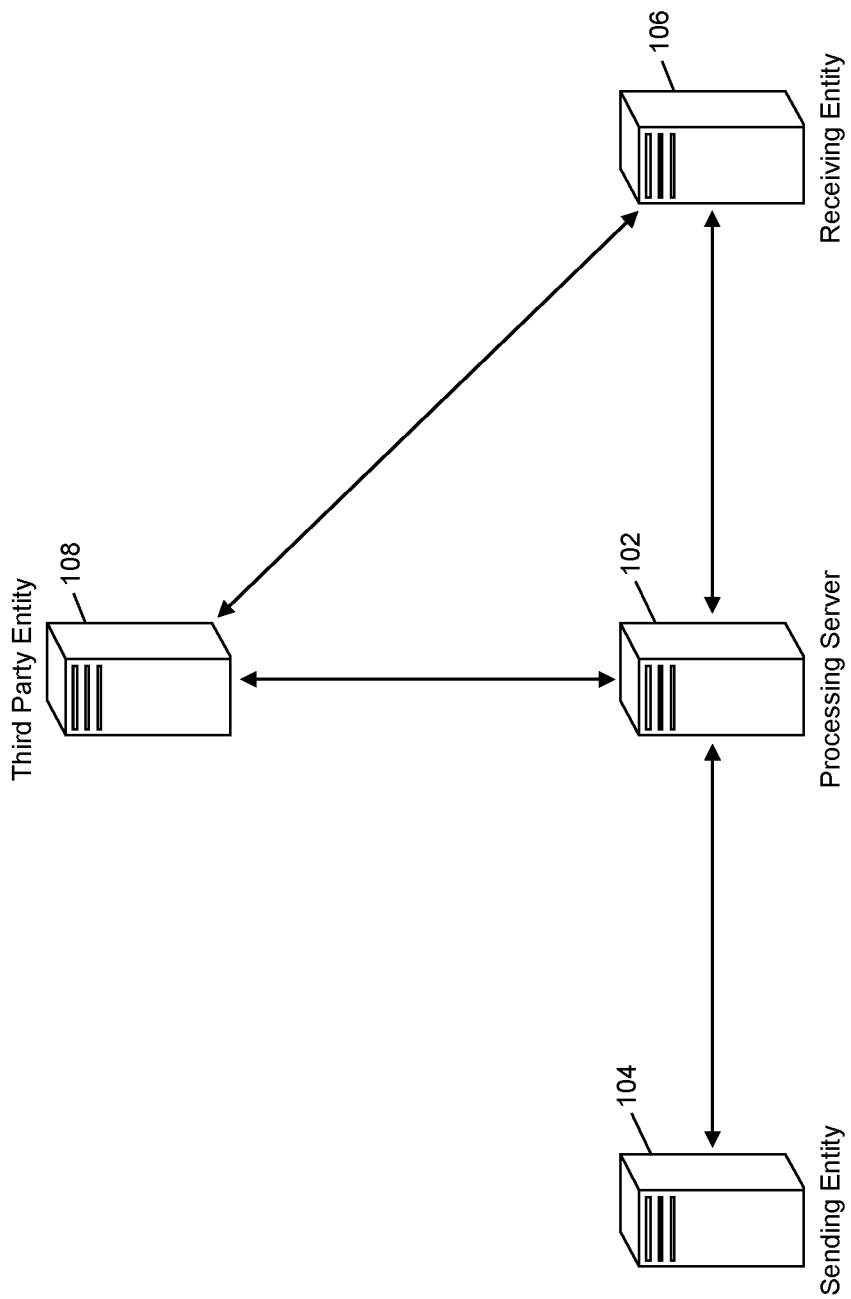
FIG. 1 is a block diagram illustrating a high level system architecture for the posting of anonymous directed transactions in accordance with exemplary embodiments.

FIG. 1 illustrates a system 100 for the posting of transactions to a publicly accessible data source where the entities involved therein are anonymous to enable a transaction to be directed between two anonymous parties and still publicly accessible, without compromising the identity or data of each of the parties.

The system 100 may include a processing server 102. The processing server 102, discussed in more detail below, may be configured to facilitate the directing of anonymous transactions, where data associated therewith is posted to a publicly accessible data source. The processing server 102 may receive a transaction request from a sending entity 104. The sending entity 104 may be any entity that desires to send funds or otherwise initiate a transaction with a second entity. The transaction request may be submitted to the processing server 102 via any suitable method, such as through an application programming interface, via a website, via an application program, over telephone, over short message service or multimedia messaging service message, etc. The transaction request may utilize one or more communication methods, which may be any suitable type of communication method, such as a local area network, cellular communication network, the Internet, etc.

A transaction request may include at least an entity identifier associated with a receiving entity 106 to whom the transaction is directed and additional transaction data. The additional transaction data may include any additional data necessary for use in posting the transaction, as well as any data that may be used in the processing of the transaction, or that the sending entity 104 and/or receiving entity 106 may desire. For instance, the transaction data may include, for example, a transaction amount, transaction time, transaction date, geographic location, purchase order number, invoice number, entity name, entity category, product data, offer data, reward data, loyalty data, etc. The entity identifier may be a unique value suitable for use in identifying the receiving entity 106 and data associated therewith, such as in an entity database of the processing server 102, discussed in more detail below, such as an identification number, name, telephone number, email address, merchant identification number, username, tax identification number, etc. In some embodiments, the transaction request may also include an entity identifier associated with the sending entity 104. For instance, in one example, the sending entity 104 may submit a transaction request to the processing server 102 that includes the sending entity's entity identifier, the entity identifier for the receiving entity 106, a transaction amount, and a currency type.

The processing server 102 may receive the transaction request and may generate a first hash value for the desired transaction. The first hash value may be generated via the application of one or more hashing algorithms to the transaction data included in the transaction request. In some embodiments, the transaction request may include the first hash value in place of the transaction data, such as may be generated by the sending entity 104 using the one or more hashing algorithms. In some cases, the hashing algorithm(s) may only be applied to transaction data that is provided in addition to any entity identifiers. Once the first hash value is generated, the processing server 102 may generate a second hash value for the desired transaction. The second hash value may be generated via the application of one or more hashing algorithms to at least the first hash value and a secret value associated with the receiving entity 106. In some instances, the algorithm(s) used to generate the second hash value may be the same as the algorithm(s) used in generating the first hash value. In other instances, some or each of the algorithm(s) used to generate the second hash value may be different.

The secret value may be a unique value that is associated with an entity whose value is known only to the processing server and the associated entity. For instance, the sending entity 104 may have a secret value associated therewith that is known to the processing server 102 and sending entity 104, but not to the receiving entity 106. Likewise, the receiving entity 106 may have its own secret value associated therewith, known to the receiving entity 106 and the processing server 102, but not to the sending entity 104. The processing server 102 may use the secret value associated with the receiving entity 106 (e.g., identified via the entity identifier, as discussed below) to generate the second hash value for the desired transaction. In some cases, the processing server 102 may use the public certificate of the receiving entity 106 as the secret value, where the receiving entity 106 may possess the corresponding private key, to encrypt the first hash value. The processing server 102 may then post the first and second hash values (e.g., or first hash value and encrypted hash value as the second hash value) to a publicly accessible data source.

Once the hash values are posted, the receiving entity 106 may be able to retrieve the hash values from the publicly available source to identify if they are involved in the posted transaction. The receiving entity 106 may hash the first value of a posted transaction using their associated secret value (e.g., the corresponding private key if a public key was used as the secret value) to generate a specialized hash value. If the specialized hash value is equivalent to the second hash value, then the transaction is directed to them. If the specialized hash value is not equivalent to the second hash value, then they are not involved in the transaction. In some cases, the receiving entity 106 may use their private key to attempt to decrypt the second hash value, if the processing server 102 generated the second hash value via encryption using the corresponding public key. If such decryption is impossible, or the first hash value is not obtained via the decryption, then the receiving entity 106 is not involved in the transaction.

The publicly available data source to which transaction hash values are posted may be any suitable type of data source. For example, the data source may be a publicly accessible database, with each pair of hash values being added as a new entry into a table. In another example, the data source may be a blockchain, where each pair of transaction hashes is a transaction value that is included in a block that is verified and added to the blockchain. In such an example, the processing server 102 may be a node in a blockchain network or may be configured to electronically transmit the generated hash values to a blockchain node, which may include the hash values in a newly generated block that is verified by other blockchain nodes prior to being added to the blockchain. The receiving entity 106 may identify the transaction hashes included in any newly added block, and use their secret value to identify if any of the transactions involve them.

In some embodiments, the processing server 102 may be configured to provide the transaction data for a transaction to an involved entity upon request. In such embodiments, once the receiving entity 106 identifies that they are involved in a posted transaction (e.g., using their associated secret value), the receiving entity 106 may submit a data request. The data request may be submitted to the processing server 102 using any suitable method, such as an application programming interface, website, application program, etc., and be communicated using any suitable communication network, such as a local area network, cellular communication network, the Internet, etc. The data request may include at least the first hash value for the transaction, and another value that proves the receiving entity's identity. The processing server 102 may evaluate the proof to ensure that the transaction data is being requested by an entity involved in the transaction, and may return a data message to the receiving entity 106 that includes the transaction data. The value that proves the receiving entity's identity may be the secret value associated therewith or another value, such as a digital certificate issued to and/or digitally signed by the receiving entity 106. For instance, the receiving entity 106 may digitally sign the data request using a private key of a key pair associated with the receiving entity 106, where the processing server 102 may verify their identity by verifying the digital signature using a corresponding public key.

In some cases, the processing server 102 may use a third party entity 108 for conveyance of the transaction data. For instance, once the processing server 102 has posted the hash values for the transaction, the processing server 102 may provide the first hash value and information identifying the receiving entity 106 associated therewith to the third party entity 108. The third party entity 108 may be configured to verify the receiving entity's identity for the providing of the transaction data. For instance, the third party entity 108 may be a digital certificate issuer, which may issue certificates to entities and be configured to verify the certificates prior to distributing transaction data.

In some embodiments, the processing server 102 may be configured to facilitate the rest of the transaction between the sending entity 104 and the receiving entity 106. In such embodiments, the processing server 102 may post the hash values for the transaction to the publicly accessible data source, and may then initiate a payment transaction from the sending entity 104 to the receiving entity 106. For instance, the processing server 102 may generate and submit an authorization request to a payment network (e.g., as a third party entity 108) that may process the payment transaction. In such embodiments, the processing server 102 may possess account identifiers associated with the sending entity 104 and receiving entity 106 (e.g., which may be used as, or in addition to, secret values) that are included in the authorization request. As a result, the payment transaction may be submitted and processed without participation by the sending entity 104 or receiving entity 106 beyond the posting of the transaction to the publicly accessible data source, and in such a way that neither entity may possess account data of the other entity, preserving anonymity. Additional detail regarding the initiation and processing of a payment transaction is discussed below with respect to the process 500 illustrated in FIG. 5.

In one embodiment, the processing server 102 may be configured to encrypt the first hash value for a transaction as an alternative to, or in addition to, the use of the second hash value. In such an embodiment, the processing server 102 may encrypt the first hash value with a public key or other suitable value associated with the receiving entity 106 that is known to the receiving entity 106. The encrypted first hash value may thus be posted to the publicly accessible data source, where the receiving entity 106 may, as an alternative to or in addition to generating a check for the second hash value, attempt to decrypt the encrypted first hash value. If encryption is successful, then the transaction may involve the receiving entity 106.

The methods and systems discussed herein enable a transaction to be directed to a specific receiving entity 106 anonymously via a publicly accessible data source. The anonymity of the entities involved in the transaction may ensure that, despite the public availability of data related thereto, the only entity that can identify multiple transactions as being associated with any specific entity, is that specific entity itself. As a result, the processing server 102 may provide greater security and accountability (e.g., due to the public availability of the data) for directing anonymous transactions, while still retaining anonymity in each and every transaction that any entity is involved with.

Processing Server

Figure 2:
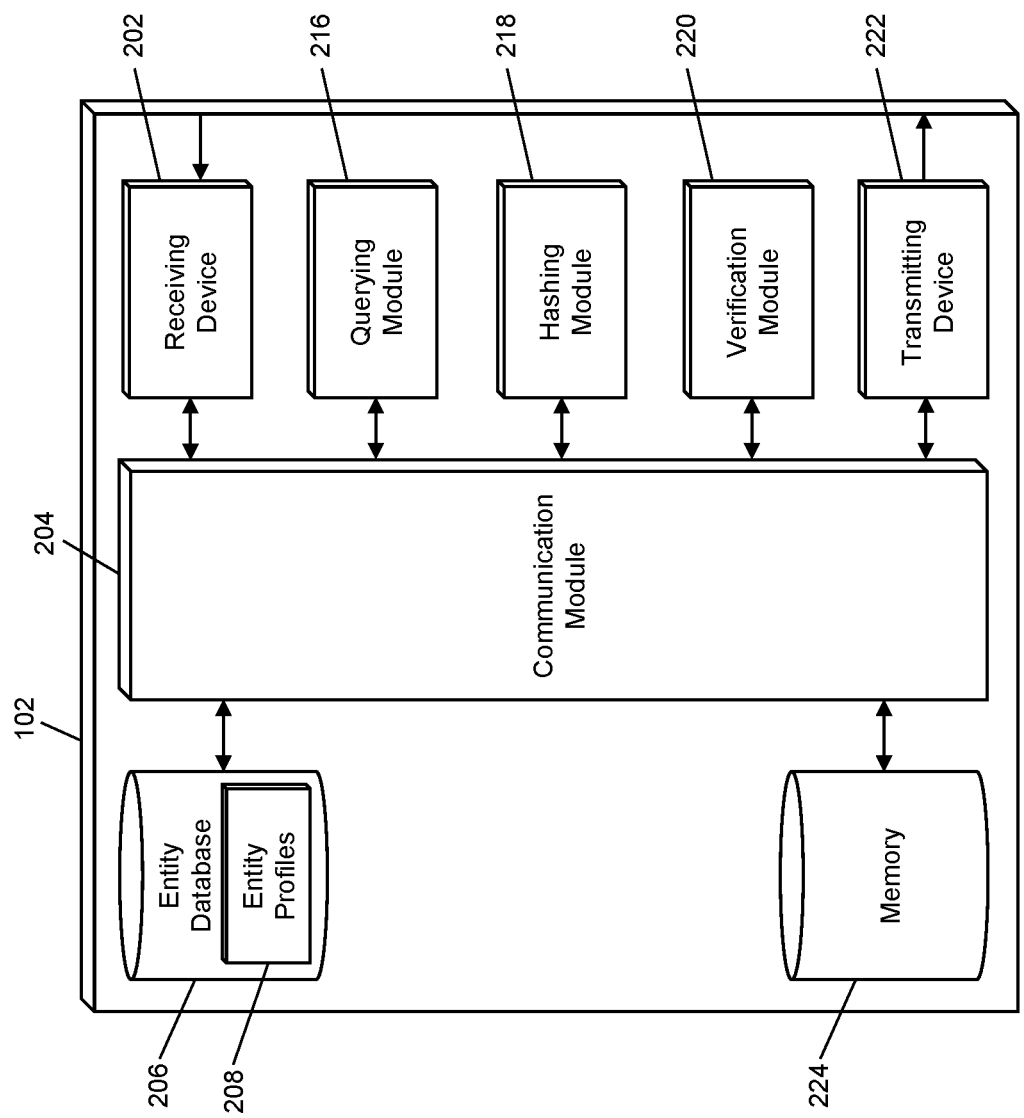
FIG. 2 is a block diagram illustrating the processing server of the system of FIG. 1 for the posting of anonymous directed transactions in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 600 illustrated in FIG. 6 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from sending entities 104, receiving entities 106, third party entities 108, and other systems and entities via one or more communication methods, such as near field communication, Bluetooth, the Internet, local area networks, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by sending entities 104, which may be superimposed or otherwise encoded with transaction requests. Transaction requests may include at least an entity identifier and transaction data. The receiving device 202 may also be configured to receive data signals electronically transmitted by receiving entities 106, which may be superimposed or otherwise encoded with data requests, the data requests including a transaction hash value and information identifying an entity, such as a digital certificate, digital signature, secret value, etc.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art, such as a processor configured to execute smart contracts, such as via the execution of executable scripts associated therewith. In some embodiments, the processing device may include and/or be comprised of a plurality of engines and/or modules specially configured to perform one or more functions of the processing device, such as a querying module 216, hashing module 218, verification module 220, etc. As used herein, the term "module" may be software executed on hardware or hardware otherwise particularly programmed to receive an input, perform one or more processes using the input, and provides an output. The input, output, and processes performed by various modules will be apparent to one skilled in the art based upon the present disclosure.

The processing server 102 may include an entity database 206. The entity database 206 may be configured to store a plurality of entity profiles 208 using a suitable data storage format and schema. The entity database 206 may be a relational database that utilizes structured query language for the storage, identification, modifying, updating, accessing, etc. of structured data sets stored therein. Each entity profile 208 may be a structured data set configured to store data related to a sending entity 104 or receiving entity 106. The entity profile 208 may include at least an entity identifier associated with the related entity as well as a secret value associated with the related entity. In some embodiments, an entity profile 208 may also include an account identifier, digital certificate, public key, or other data that may be used in performing the functions of the processing server 102 as discussed herein.

The processing server 102 may include a querying module 216. The querying module 216 may be configured to execute queries on databases to identify and perform other actions related to information. The querying module 216 may receive one or more data values or query strings, and may execute a query string based thereon on an indicated database, such as the entity database 206, to identify, modify, insert, update, etc. information stored therein. The querying module 216 may output identified information to an appropriate engine or module of the processing server 102 as necessary. The querying module 216 may, for example, execute a query on the entity database 206 to identify an entity profile 208 associated with a receiving entity 106 based on an entity identifier included in a transaction request (e.g., received by the receiving device 202).

The processing server 102 may also include a hashing module 218. The hashing module 218 may be configured to hash data for the processing server 102 for the generation of hash values. The hashing module 218 may receive data to be hashed as input, may generate hash values via the application of one or more hashing algorithms thereto, and may output the resulting hash value to another module or engine of the processing server 102. In some embodiments, the input may include the one or more hashing algorithms or indications thereof. In other embodiments, the hashing module 218 may be configured to identify the hashing algorithm(s) (e.g., in a memory 224 of the processing server 102) to be used. The hashing module 218 may be configured, for example, to generate hash values of transaction data and generate hash values of a combination of a hash value and secret value. In some instances, the hashing module 218 may also operate as an encryption module, configured to encrypt hash values using data associated with a receiving entity 106.

The processing server 102 may also include a verification module 220. The verification module 220 may be configured to verify data for the processing server 102. The verification module 220 may receive data to be verified as input, may perform verification of the data, and may output a result (e.g., indicating positive or negative verification) of the verification to another module or engine of the processing server 102. For example, the verification module 220 may be configured to verify a digital certificate or digital signature included in a data request (e.g., received by the receiving device 202), such as using data stored in an entity profile 208 related to a receiving entity 106 from which the data request is submitted.

The processing server 102 may also include a transmitting device 222. The transmitting device 222 may be configured to transmit data over one or more networks via one or more network protocols. In some instances, the transmitting device 222 may be configured to transmit data to sending entities 104, receiving entities 106, third party entities 108, and other entities via one or more communication methods, such as near field communication, Bluetooth, radio frequency, the Internet, local area networks, etc. In some embodiments, the transmitting device 222 may be comprised of multiple devices, such as different transmitting devices for transmitting data over different networks, such as a first transmitting device for transmitting data over a local area network and a second transmitting device for transmitting data via the Internet. The transmitting device 222 may electronically transmit data signals that have data superimposed that may be parsed by a receiving computing device. In some instances, the transmitting device 222 may include one or more modules for superimposing, encoding, or otherwise formatting data into data signals suitable for transmission.

The transmitting device 222 may be configured to electronically transmit data signals to receiving entities 106 that are superimposed or otherwise encoded with transaction hash values, such as via an application programming interface enabling the receiving entity 106 to access the publicly accessible data source. The transmitting device 222 may also be configured to electronically transmit data signals to receiving entities 106 that are superimposed or otherwise encoded with transaction data, such as in response to a received data request. The transmitting device 222 may also be configured to electronically transmit data signals to third party entities 108, which may be superimposed or otherwise encoded with transaction data (e.g., for providing to receiving entities 106), transaction hash values (e.g., for making publicly available), authorization requests (e.g., for processing by a payment network), etc. For instance, the transmitting device 222 may submit authorization requests to a payment network via payment rails associated therewith for processing of a payment transaction.

The processing server 102 may also include a memory 224. The memory 224 may be configured to store data for use by the processing server 102 in performing the functions discussed herein, such as public and private keys, symmetric keys, etc. The memory 224 may be configured to store data using suitable data formatting methods and schema and may be any suitable type of memory, such as read-only memory, random access memory, etc. The memory 224 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 224 may be comprised of or may otherwise include a relational database that utilizes structured query language for the storage, identification, modifying, updating, accessing, etc. of structured data sets stored therein.

The memory 224 may be configured to store hashing algorithms used in generating first hash values using transaction data and in generating second hash values using first hash values and secret values. The memory 224 may also be configured to store the publicly accessible data source, such as via storage of a publicly accessible database, a blockchain, or other suitable data source. In some instances where the memory 224 may be configured to store the blockchain as the publicly accessible data source, the processing server 102 may be configured to operate as a blockchain node and perform the functions associated therewith.

Process for Posting and Verifying Anonymous Transactions

Figure 3B:
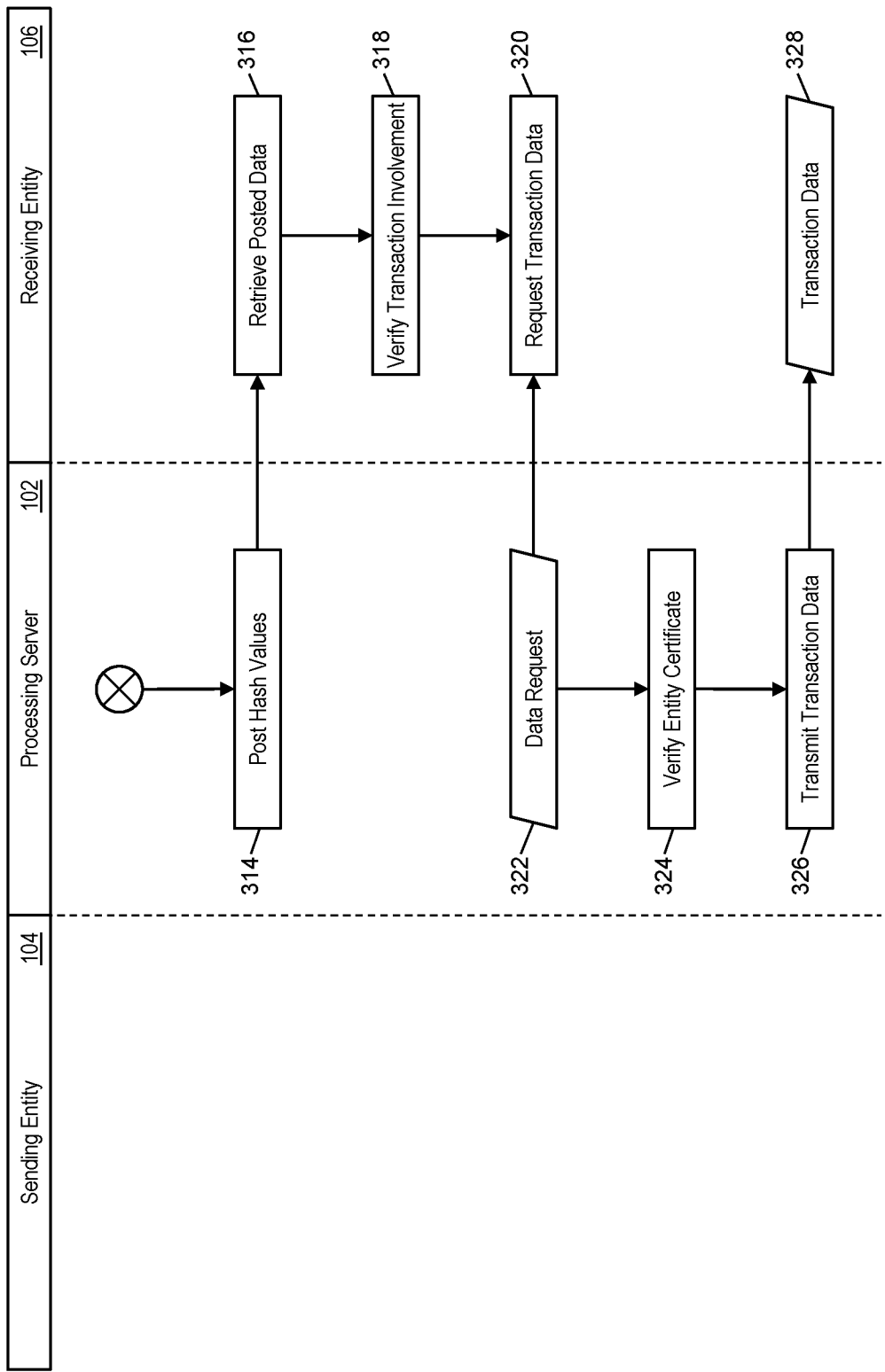

FIGS. 3A and 3B illustrate a process for the posting of anonymous directed transactions to a publicly accessible data source by the processing server 102 and verification and retrieval thereof by the receiving entity 106.

In step 302, the sending entity 104 may generate transaction data for a transaction, such as for the payment of funds from the sending entity 104 to the receiving entity 106. The transaction data generated by the sending entity 104 may include at least the entity identifier associated with the receiving entity 106, such as an identification number or the name of the receiving entity 106. In step 304, the sending entity 104 may submit a transaction request to the processing server 102 using a suitable communication method, such as via an application programming interface operated by or on behalf of the processing server 102.

In step 306, the receiving device 202 of the processing server 102 may receive the transaction data and the entity identifier. In step 308, the querying module 216 of the processing server 102 may execute a query on the entity database 206 of the processing server 102 to identify an entity profile 208 associated with the receiving entity 106, where the entity profile 208 includes the entity identifier received from the sending entity 104. In step 310, the hashing module 218 of the processing server 102 may generate a first hash value, also referred to herein as a transaction hash, via the application of one or more hashing algorithms to the received transaction data.

In step 312, the hashing module 218 of the processing server 102 may generate a second hash value, also referred to herein as an institution hash, via the application of one or more hashing algorithms to the first hash value and a secret value associated with the receiving entity 106, identified in the related entity profile 208. In some embodiments, the secret value and first hash value may be combined using a predetermined method and/or format prior to application of the hashing algorithm(s). In step 314, the transmitting device 222 of the processing server 102 may post the first and second hash values for the transaction in a manner that makes them publically accessible, such as by storing the hash values in the memory 224 of the processing server 102 and distributing them to any entity upon request.

In step 316, the receiving entity 106 may retrieve the first and second hash values, among other data posted by the processing server 102 that may be retrieved. In step 318, the receiving entity 106 may verify their involvement in the transaction for which the first and second hash values were generated. The verification may be performed by hashing the first hash value with the secret value associated with the receiving entity 106 and known thereto, where the resulting value is compared to the second hash value, such that a positive match between the two values indicates the receiving entity 106 as the desired recipient for the transaction. In step 320, the receiving entity 106 may submit a data request to the processing server 102 using a suitable communication method, such as via an application programming interface operated by or on behalf of the processing server 102.

In step 322, the receiving device 202 of the processing server 102 may receive the data request. The data request may include at least the first hash value for the transaction, and an additional data value associated with the receiving entity 106 suitable for use as proof of the identity of the receiving entity 106. In some embodiments, the additional data value may be a digital certificate associated with the receiving entity 106, such as may be issued to the receiving entity 106 by a trusted third party entity 108. In step 324, the verification module 220 of the processing server 102 may verify the digital certificate included in the data request as genuine and as associated with the receiving entity 106 involved in the transaction. Upon successful verification, in step 326, the transmitting device 222 of the processing server 102 may electronically transmit the transaction data for the transaction to the receiving entity 106 in response to the data request. In step 328, the receiving entity 106 may receive the transaction data.

Exemplary Method for Posting of an Anonymous directed Transaction

FIG. 4 illustrates a method 400 for the posting of an anonymous directed transaction to a publicly accessible data source, where data associated therewith is only identifiable by an intended entity.

In step 402, a plurality of entity profiles (e.g., the entity profiles 208) may be stored in an entity database (e.g., the entity database 206) of a processing server (e.g., the processing server 102), wherein each entity profile is a structured data set related to an entity including at least an entity identifier and a secret value. In step 404, a transaction request may be received by a receiving device (e.g., the receiving device 202) of the processing server from a first entity (e.g., the sending entity 104), wherein the transaction request includes at least transaction data and a specific entity identifier associated with a second entity (e.g., the receiving entity 106).

In step 406, a query may be executed on the entity database by a querying module (e.g., the querying module 216) of the processing server to identify a specific entity profile where the included entity identifier corresponds to the specific entity identifier. In step 408, a first hash value may be generated by a hashing module (e.g., the hashing module 218) of the processing server via application of one or more hashing algorithms to the transaction data.

In step 410, a second hash value may be generated by the hashing module of the processing server via application of one or more hashing algorithms to a combination of the first hash value and the secret value included in the identified specific entity profile. In step 412, at least the first hash value and second hash value may be posted by a transmitting device (e.g., the transmitting device 222) of the processing server to a publicly accessible data source.

In one embodiment, the publicly accessible data source may be a blockchain. In another embodiment, the publicly accessible data source may be a memory (e.g., the memory 224) of the processing server that is accessible by external computing systems. In some embodiments, the secret value may be a random or pseudo random value of at least 128 bits.

In one embodiment, the method 400 may further include: receiving, by the receiving device of the processing server, a data request from the second entity; and electronically transmitting, by the transmitting device of the processing server, the transaction data to the second entity. In a further embodiment, the data request may further include a client certificate and the method 400 may even further include verifying, by a verification module (e.g., the verification module 220) of the processing server, the client certificate prior to transmission of the transaction data to the second entity. In some embodiments, the method 400 may also include electronically transmitting, by the transmitting device of the processing server, the transaction data to a third entity (e.g., the third party entity 108).

Payment Transaction Processing System and Process

Figure 5:
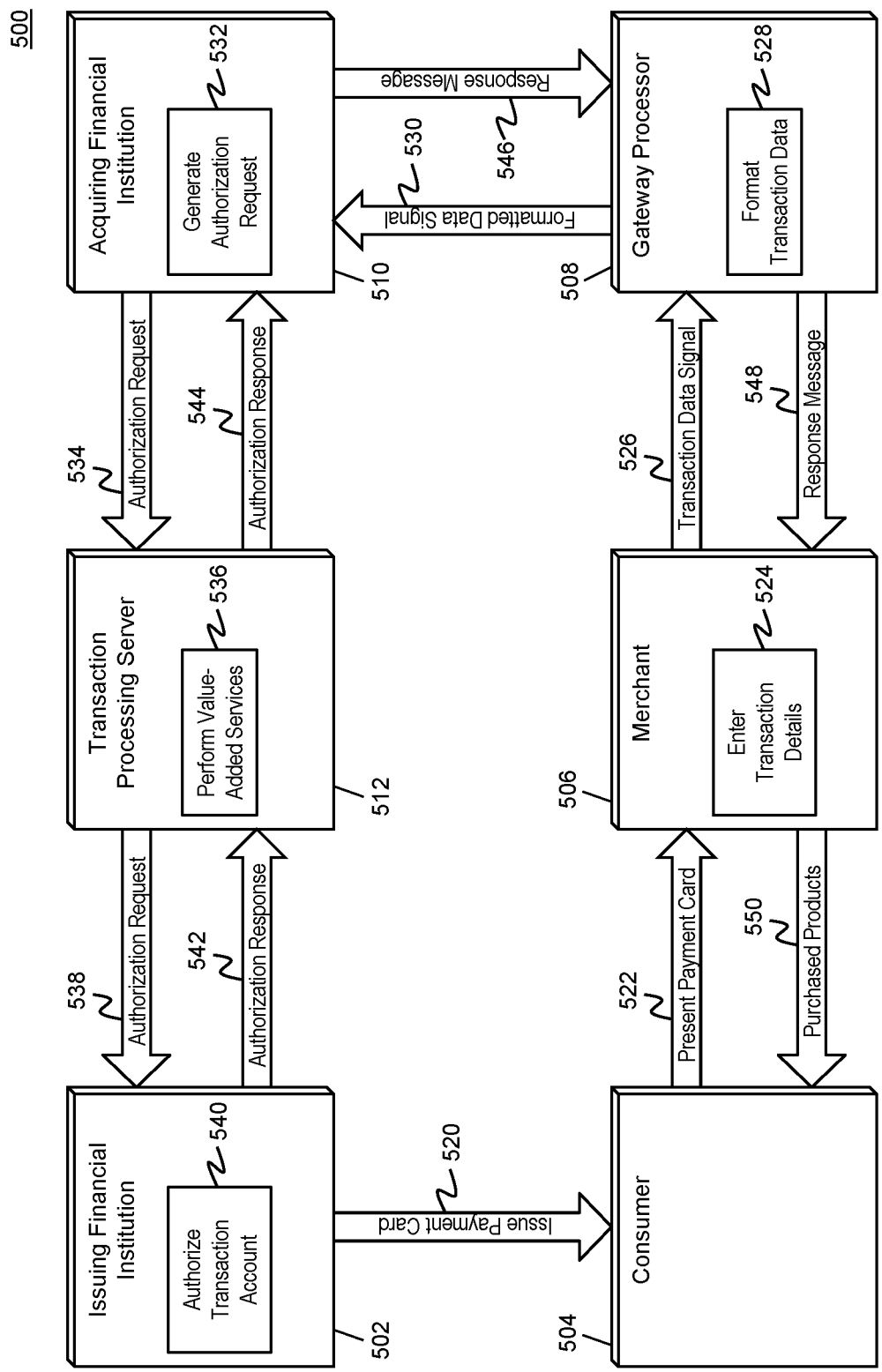
FIG. 5 is a flow diagram illustrating the processing of a payment transaction in accordance with exemplary embodiments.

FIG. 5 illustrates a transaction processing system and a process 500 for the processing of payment transactions in the system, which may include the processing of thousands, millions, or even billions of transactions during a given period (e.g., hourly, daily, weekly, etc.). The process 500 and steps included therein may be performed by one or more components of the system 100 discussed above, such as the processing server 102, sending entity 104, receiving entity 106, third party entity 108, etc. The processing of payment transactions using the system and process 500 illustrated in FIG. 5 and discussed below may utilize the payment rails, which may be comprised of the computing devices and infrastructure utilized to perform the steps of the process 500 as specially configured and programmed by the entities discussed below, including the transaction processing server 512, which may be associated with one or more payment networks configured to processing payment transactions. It will be apparent to persons having skill in the relevant art that the process 500 may be incorporated into the processes illustrated in FIGS. 3A, 3B, and 4, discussed above, with respect to the step or steps involved in the processing of a payment transaction. In addition, the entities discussed herein for performing the process 500 may include one or more computing devices or systems configured to perform the functions discussed below. For instance, the merchant 506 may be comprised of one or more point of sale devices, a local communication network, a computing server, and other devices configured to perform the functions discussed below.

In step 520, an issuing financial institution 502 may issue a payment card or other suitable payment instrument to a consumer 504. The issuing financial institution may be a financial institution, such as a bank, or other suitable type of entity that administers and manages payment accounts and/ or payment instruments for use with payment accounts that can be used to fund payment transactions. The consumer 504 may have a transaction account with the issuing financial institution 502 for which the issued payment card is associated, such that, when used in a payment transaction, the payment transaction is funded by the associated transaction account. In some embodiments, the payment card may be issued to the consumer 504 physically. In other embodiments, the payment card may be a virtual payment card or otherwise provisioned to the consumer 504 in an electronic format.

In step 522, the consumer 504 may present the issued payment card to a merchant 506 for use in funding a payment transaction. The merchant 506 may be a business, another consumer, or any entity that may engage in a payment transaction with the consumer 504. The payment card may be presented by the consumer 504 via providing the physical card to the merchant 506, electronically transmitting (e.g., via near field communication, wireless transmission, or other suitable electronic transmission type and protocol) payment details for the payment card, or initiating transmission of payment details to the merchant 506 via a third party. The merchant 506 may receive the payment details (e.g., via the electronic transmission, via reading them from a physical payment card, etc.), which may include at least a transaction account number associated with the payment card and/or associated transaction account. In some instances, the payment details may include one or more application cryptograms, which may be used in the processing of the payment transaction.

In step 524, the merchant 506 may enter transaction details into a point of sale computing system. The transaction details may include the payment details provided by the consumer 504 associated with the payment card and additional details associated with the transaction, such as a transaction amount, time and/or date, product data, offer data, loyalty data, reward data, merchant data, consumer data, point of sale data, etc. Transaction details may be entered into the point of sale system of the merchant 506 via one or more input devices, such as an optical bar code scanner configured to scan product bar codes, a keyboard configured to receive product codes input by a user, etc. The merchant point of sale system may be a specifically configured computing device and/or special purpose computing device intended for the purpose of processing electronic financial transactions and communicating with a payment network (e.g., via the payment rails). The merchant point of sale system may be an electronic device upon which a point of sale system application is run, wherein the application causes the electronic device to receive and communicated electronic financial transaction information to a payment network. In some embodiments, the merchant 506 may be an online retailer in an e-commerce transaction. In such embodiments, the transaction details may be entered in a shopping cart or other repository for storing transaction data in an electronic transaction as will be apparent to persons having skill in the relevant art.

In step 526, the merchant 506 may electronically transmit a data signal superimposed with transaction data to a gateway processor 508. The gateway processor 508 may be an entity configured to receive transaction details from a merchant 506 for formatting and transmission to an acquiring financial institution 510. In some instances, a gateway processor 508 may be associated with a plurality of merchants 506 and a plurality of acquiring financial institutions 510. In such instances, the gateway processor 508 may receive transaction details for a plurality of different transactions involving various merchants, which may be forwarded on to appropriate acquiring financial institutions 510. By having relationships with multiple acquiring financial institutions 510 and having the requisite infrastructure to communicate with financial institutions using the payment rails, such as using application programming interfaces associated with the gateway processor 508 or financial institutions used for the submission, receipt, and retrieval of data, a gateway processor 508 may act as an intermediary for a merchant 506 to be able to conduct payment transactions via a single communication channel and format with the gateway processor 508, without having to maintain relationships with multiple acquiring financial institutions 510 and payment processors and the hardware associated thereto. Acquiring financial institutions 510 may be financial institutions, such as banks, or other entities that administers and manages payment accounts and/or payment instruments for use with payment accounts. In some instances, acquiring financial institutions 510 may manage transaction accounts for merchants 506. In some cases, a single financial institution may operate as both an issuing financial institution 502 and an acquiring financial institution 510.

The data signal transmitted from the merchant 506 to the gateway processor 508 may be superimposed with the transaction details for the payment transaction, which may be formatted based on one or more standards. In some embodiments, the standards may be set forth by the gateway processor 508, which may use a unique, proprietary format for the transmission of transaction data to/from the gateway processor 508. In other embodiments, a public standard may be used, such as the International Organization for Standardization's ISO 8583 standard. The standard may indicate the types of data that may be included, the formatting of the data, how the data is to be stored and transmitted, and other criteria for the transmission of the transaction data to the gateway processor 508.

In step 528, the gateway processor 508 may parse the transaction data signal to obtain the transaction data superimposed thereon and may format the transaction data as necessary. The formatting of the transaction data may be performed by the gateway processor 508 based on the proprietary standards of the gateway processor 508 or an acquiring financial institution 510 associated with the payment transaction. The proprietary standards may specify the type of data included in the transaction data and the format for storage and transmission of the data. The acquiring financial institution 510 may be identified by the gateway processor 508 using the transaction data, such as by parsing the transaction data (e.g., deconstructing into data elements) to obtain an account identifier included therein associated with the acquiring financial institution 510. In some instances, the gateway processor 508 may then format the transaction data based on the identified acquiring financial institution 510, such as to comply with standards of formatting specified by the acquiring financial institution 510. In some embodiments, the identified acquiring financial institution 510 may be associated with the merchant 506 involved in the payment transaction, and, in some cases, may manage a transaction account associated with the merchant 506.

In step 530, the gateway processor 508 may electronically transmit a data signal superimposed with the formatted transaction data to the identified acquiring financial institution 510. The acquiring financial institution 510 may receive the data signal and parse the signal to obtain the formatted transaction data superimposed thereon. In step 532, the acquiring financial institution may generate an authorization request for the payment transaction based on the formatted transaction data. The authorization request may be a specially formatted transaction message that is formatted pursuant to one or more standards, such as the ISO 8583 standard and standards set forth by a payment processor used to process the payment transaction, such as a payment network. The authorization request may be a transaction message that includes a message type indicator indicative of an authorization request, which may indicate that the merchant 506 involved in the payment transaction is requesting payment or a promise of payment from the issuing financial institution 502 for the transaction. The authorization request may include a plurality of data elements, each data element being configured to store data as set forth in the associated standards, such as for storing an account number, application cryptogram, transaction amount, issuing financial institution 502 information, etc.

In step 534, the acquiring financial institution 510 may electronically transmit the authorization request to a transaction processing server 512 for processing. The transaction processing server 512 may be comprised of one or more computing devices as part of a payment network configured to process payment transactions. In some embodiments, the authorization request may be transmitted by a transaction processor at the acquiring financial institution 510 or other entity associated with the acquiring financial institution. The transaction processor may be one or more computing devices that include a plurality of communication channels for communication with the transaction processing server 512 for the transmission of transaction messages and other data to and from the transaction processing server 512. In some embodiments, the payment network associated with the transaction processing server 512 may own or operate each transaction processor such that the payment network may maintain control over the communication of transaction messages to and from the transaction processing server 512 for network and informational security.

In step 536, the transaction processing server 512 may perform value-added services for the payment transaction. Value-added services may be services specified by the issuing financial institution 502 that may provide additional value to the issuing financial institution 502 or the consumer 504 in the processing of payment transactions. Value-added services may include, for example, fraud scoring, transaction or account controls, account number mapping, offer redemption, loyalty processing, etc. For instance, when the transaction processing server 512 receives the transaction, a fraud score for the transaction may be calculated based on the data included therein and one or more fraud scoring algorithms and/or engines. In some instances, the transaction processing server 512 may first identify the issuing financial institution 502 associated with the transaction, and then identify any services indicated by the issuing financial institution 502 to be performed. The issuing financial institution 502 may be identified, for example, by data included in a specific data element included in the authorization request, such as an issuer identification number. In another example, the issuing financial institution 502 may be identified by the primary account number stored in the authorization request, such as by using a portion of the primary account number (e.g., a bank identification number) for identification.

In step 538, the transaction processing server 512 may electronically transmit the authorization request to the issuing financial institution 502. In some instances, the authorization request may be modified, or additional data included in or transmitted accompanying the authorization request as a result of the performance of value-added services by the transaction processing server 512. In some embodiments, the authorization request may be transmitted to a transaction processor (e.g., owned or operated by the transaction processing server 512) situated at the issuing financial institution 502 or an entity associated thereof, which may forward the authorization request to the issuing financial institution 502.

In step 540, the issuing financial institution 502 may authorize the transaction account for payment of the payment transaction. The authorization may be based on an available credit amount for the transaction account and the transaction amount for the payment transaction, fraud scores provided by the transaction processing server 512, and other considerations that will be apparent to persons having skill in the relevant art. The issuing financial institution 502 may modify the authorization request to include a response code indicating approval (e.g., or denial if the transaction is to be denied) of the payment transaction. The issuing financial institution 502 may also modify a message type indicator for the transaction message to indicate that the transaction message is changed to be an authorization response. In step 542, the issuing financial institution 502 may transmit (e.g., via a transaction processor) the authorization response to the transaction processing server 512.

In step 544, the transaction processing server 512 may forward the authorization response to the acquiring financial institution 510 (e.g., via a transaction processor). In step 546, the acquiring financial institution may generate a response message indicating approval or denial of the payment transaction as indicated in the response code of the authorization response, and may transmit the response message to the gateway processor 508 using the standards and protocols set forth by the gateway processor 508. In step 548, the gateway processor 508 may forward the response message to the merchant 506 using the appropriate standards and protocols. In step 550, assuming the transaction was approved, the merchant 506 may then provide the products purchased by the consumer 504 as part of the payment transaction to the consumer 504.

In some embodiments, once the process 500 has completed, payment from the issuing financial institution 502 to the acquiring financial institution 510 may be performed. In some instances, the payment may be made immediately or within one business day. In other instances, the payment may be made after a period of time, and in response to the submission of a clearing request from the acquiring financial institution 510 to the issuing financial institution 502 via the transaction processing server 512. In such instances, clearing requests for multiple payment transactions may be aggregated into a single clearing request, which may be used by the transaction processing server 512 to identify overall payments to be made by whom and to whom for settlement of payment transactions.

In some instances, the system may also be configured to perform the processing of payment transactions in instances where communication paths may be unavailable. For example, if the issuing financial institution is unavailable to perform authorization of the transaction account (e.g., in step 540), the transaction processing server 512 may be configured to perform authorization of transactions on behalf of the issuing financial institution 502. Such actions may be referred to as "stand-in processing," where the transaction processing server "stands in" as the issuing financial institution 502. In such instances, the transaction processing server 512 may utilize rules set forth by the issuing financial institution 502 to determine approval or denial of the payment transaction, and may modify the transaction message accordingly prior to forwarding to the acquiring financial institution 510 in step 544. The transaction processing server 512 may retain data associated with transactions for which the transaction processing server 512 stands in, and may transmit the retained data to the issuing financial institution 502 once communication is reestablished. The issuing financial institution 502 may then process transaction accounts accordingly to accommodate for the time of lost communication.

In another example, if the transaction processing server 512 is unavailable for submission of the authorization request by the acquiring financial institution 510, then the transaction processor at the acquiring financial institution 510 may be configured to perform the processing of the transaction processing server 512 and the issuing financial institution 502. The transaction processor may include rules and data suitable for use in making a determination of approval or denial of the payment transaction based on the data included therein. For instance, the issuing financial institution 502 and/or transaction processing server 512 may set limits on transaction type, transaction amount, etc. that may be stored in the transaction processor and used to determine approval or denial of a payment transaction based thereon. In such instances, the acquiring financial institution 510 may receive an authorization response for the payment transaction even if the transaction processing server 512 is unavailable, ensuring that transactions are processed and no downtime is experienced even in instances where communication is unavailable. In such cases, the transaction processor may store transaction details for the payment transactions, which may be transmitted to the transaction processing server 512 (e.g., and from there to the associated issuing financial institutions 502) once communication is reestablished.

In some embodiments, transaction processors may be configured to include a plurality of different communication channels, which may utilize multiple communication cards and/or devices, to communicate with the transaction processing server 512 for the sending and receiving of transaction messages. For example, a transaction processor may be comprised of multiple computing devices, each having multiple communication ports that are connected to the transaction processing server 512. In such embodiments, the transaction processor may cycle through the communication channels when transmitting transaction messages to the transaction processing server 512, to alleviate network congestion and ensure faster, smoother communications. Furthermore, in instances where a communication channel may be interrupted or otherwise unavailable, alternative communication channels may thereby be available, to further increase the uptime of the network.

In some embodiments, transaction processors may be configured to communicate directly with other transaction processors. For example, a transaction processor at an acquiring financial institution 510 may identify that an authorization request involves an issuing financial institution 502 (e.g., via the bank identification number included in the transaction message) for which no value-added services are required. The transaction processor at the acquiring financial institution 510 may then transmit the authorization request directly to the transaction processor at the issuing financial institution 502 (e.g., without the authorization request passing through the transaction processing server 512), where the issuing financial institution 502 may process the transaction accordingly.

The methods discussed above for the processing of payment transactions that utilize multiple methods of communication using multiple communication channels, and includes fail safes to provide for the processing of payment transactions at multiple points in the process and at multiple locations in the system, as well as redundancies to ensure that communications arrive at their destination successfully even in instances of interruptions, may provide for a robust system that ensures that payment transactions are always processed successfully with minimal error and interruption. This advanced network and its infrastructure and topology may be commonly referred to as "payment rails," where transaction data may be submitted to the payment rails from merchants at millions of different points of sale, to be routed through the infrastructure to the appropriate transaction processing servers 512 for processing. The payment rails may be such that a general purpose computing device may be unable to properly format or submit communications to the rails, without specialized programming and/or configuration. Through the specialized purposing of a computing device, the computing device may be configured to submit transaction data to the appropriate entity (e.g., a gateway processor 508, acquiring financial institution 510, etc.) for processing using this advanced network, and to quickly and efficiently receive a response regarding the ability for a consumer 504 to fund the payment transaction.

Computer System Architecture

Figure 6:
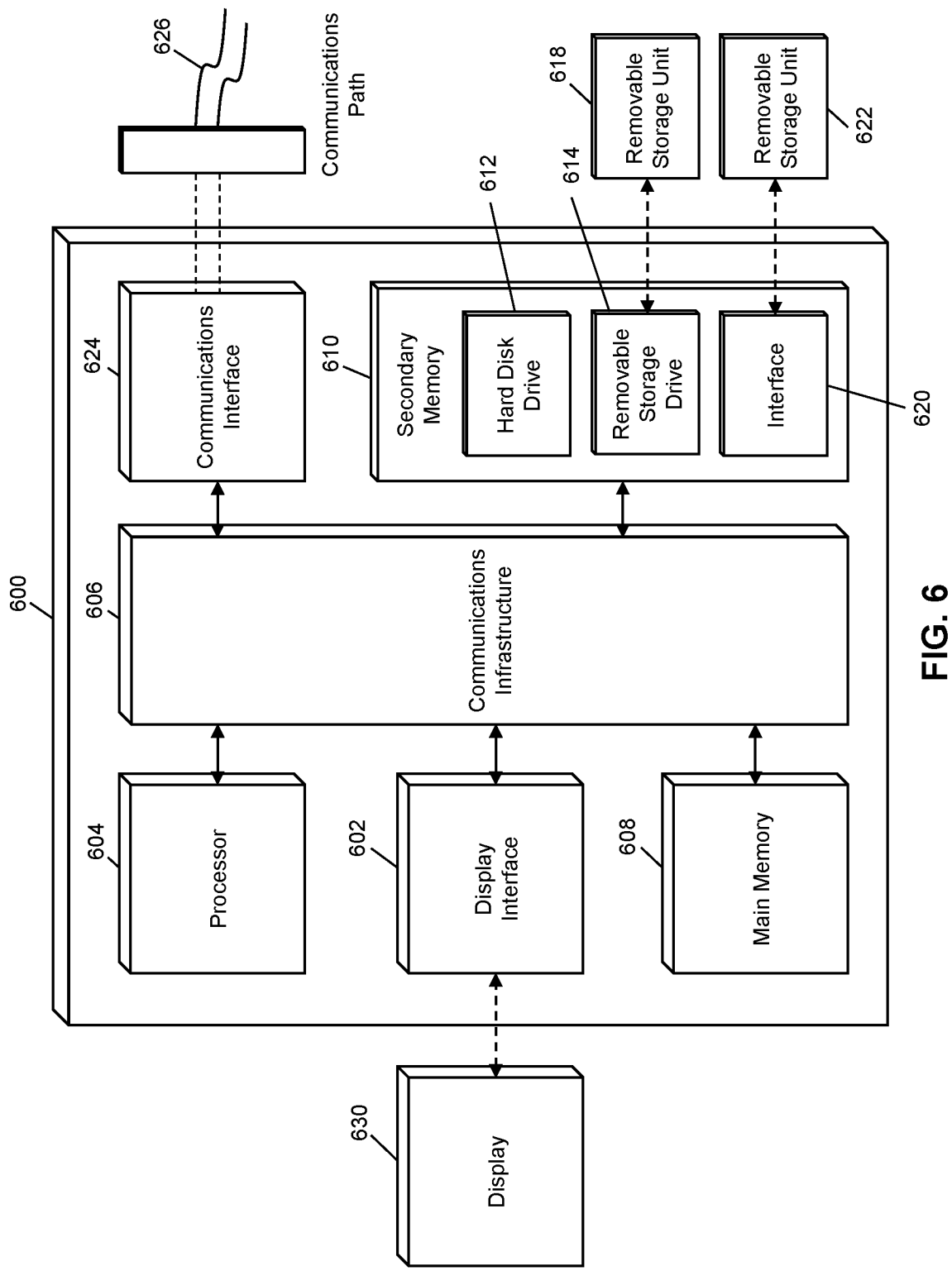
FIG. 6 is a block diagram illustrating a computer system architecture in accordance with exemplary embodiments.

FIG. 6 illustrates a computer system 600 in which embodiments of the present disclosure, or portions thereof, may be implemented as computer-readable code. For example, the processing server 102 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3A, 3B, 4, and 5.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device specifically configured to perform the functions discussed herein. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 3A, 3B, 4, and 5, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for posting of anonymous directed transactions. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for posting an anonymous directed transaction, comprising:
   receiving, by a receiving device of the processing server, from a first entity, a transaction request for a transaction with a second entity, wherein the transaction request includes at least transaction data and a specific entity identifier associated with the second entity;
   executing, by a hardware processor of the processing server, a query on an entity database to identify a specific entity profile on a basis of the specific entity identifier included in the transaction request received from the first;
   generating, by the hardware processor of the processing server, a first hash value for the transaction via application of one or more hashing algorithms to the transaction data included in the transaction request, such that the first hash value is specific to the transaction;

generating, by the hardware processor of the processing server, a second hash for the transaction value via application of one or more hashing algorithms to a combination of the generated first hash value and a secret value included in the identified specific entity profile;

initiating, by the processing server, a payment transaction for payment from the first entity to the second entity;

posting, by a transmitting device of the processing server, at least the generated first hash value and the generated second hash value to a blockchain;

retrieving, by a receiving entity, the generated first hash value and generated second hash value from the blockchain to determine whether the receiving entity was involved in the transaction;

hashing, by the receiving entity, the generated first hash value retrieved from the blockchain using a secret value associated with the receiving entity in order to generate a specialized hash value;

validating, by the receiving entity, that the generated specialized hash is equivalent to the generated second hash value retrieved from the blockchain;

in response to said validation, transmitting, by the receiving entity to the processing server, a message indicating that the receiving entity is associated with the transaction request; and responsive to receiving the message, transmitting, by the processing server to the receiving entity, a data signal that is superimposed with the transaction data included in the transaction request.

2. The method of claim 1, wherein the blockchain is stored in a memory of the processing server that is accessible by external computing systems.

3. The method of claim 1, wherein transmitting the message comprises transmitting a data request from the receiving entity.

4. The method of claim 3, wherein the data request further includes a client certificate and the method further comprises:
verifying, by the hardware processor of the processing server, the client certificate prior to transmission of the transaction data to the receiving entity.

5. The method of claim 1, wherein the secret value is a random or pseudo random value of at least 128 bits.

6. The method of claim 1, further comprising:
electronically transmitting, by the transmitting device of the processing server, the transaction data to a third entity.

7. A system for posting an anonymous directed transaction, comprising:
a hardware receiving device of the processing server receiving, from a first entity, a transaction request for a transaction with a second entity, wherein the transaction request includes at least transaction data and a specific entity identifier associated with the second entity;

a hardware processor of the processing server
executing a query on an entity database to identify a specific entity profile on a basis of the specific entity identifier included in the transaction request received from the first entity,
generating a first hash value for the transaction via application of one or more hashing algorithms to the transaction data included in the transaction request, such that the first hash value is specific to the transaction,
generating a second hash value for the transaction via application of one of more hashing algorithms to a combination of the generated first hash value and a secret value included in the identified specific entity profile, and
initiating a payment transaction for payment from the first entity to the second entity;
a hardware transmitting device of the processing server posting at least the generated first hash value and the generated second hash value to a blockchain; and
a receiving entity
retrieving the generated first hash value and the generated second hash value from the blockchain to determine whether the receiving entity was involved in the transaction,
hashing the generated first hash value, retrieved from the blockchain, using a secret value associated with the receiving entity in order to generate a specialized hash,
validating that the generated specialized hash is equivalent to the generated second hash retrieved from the blockchain, value using the generated comparison hash value, and
transmitting, to the processing server, in response to said validation, a message indicating that the receiving entity is associated with the transaction request,
wherein responsive to receiving the message, the hardware processor of the processing server, transmits, to the receiving entity, a data signal that is superimposed with the transaction data included in the transaction request.

8. The system of claim 7, wherein the blockchain is stored in a memory of the processing server that is accessible by external computing systems.

9. The system of claim 7, wherein
transmitting the message comprises transmitting a data request from the receiving entity.

10. The system of claim 9, wherein
the data request further includes a client certificate, and
the hardware processor of the processing server verifies the client certificate prior to transmission of the transaction data to the receiving entity.

11. The system of claim 7, wherein the secret value is a random or pseudo random value of at least 128 bits.

12. The system of claim 7, wherein the transmitting device of the processing server is further configured to electronically transmit the transaction data to a third entity.

* * * * *